United States Patent Office 3,608,410
Patented Sept. 28, 1971

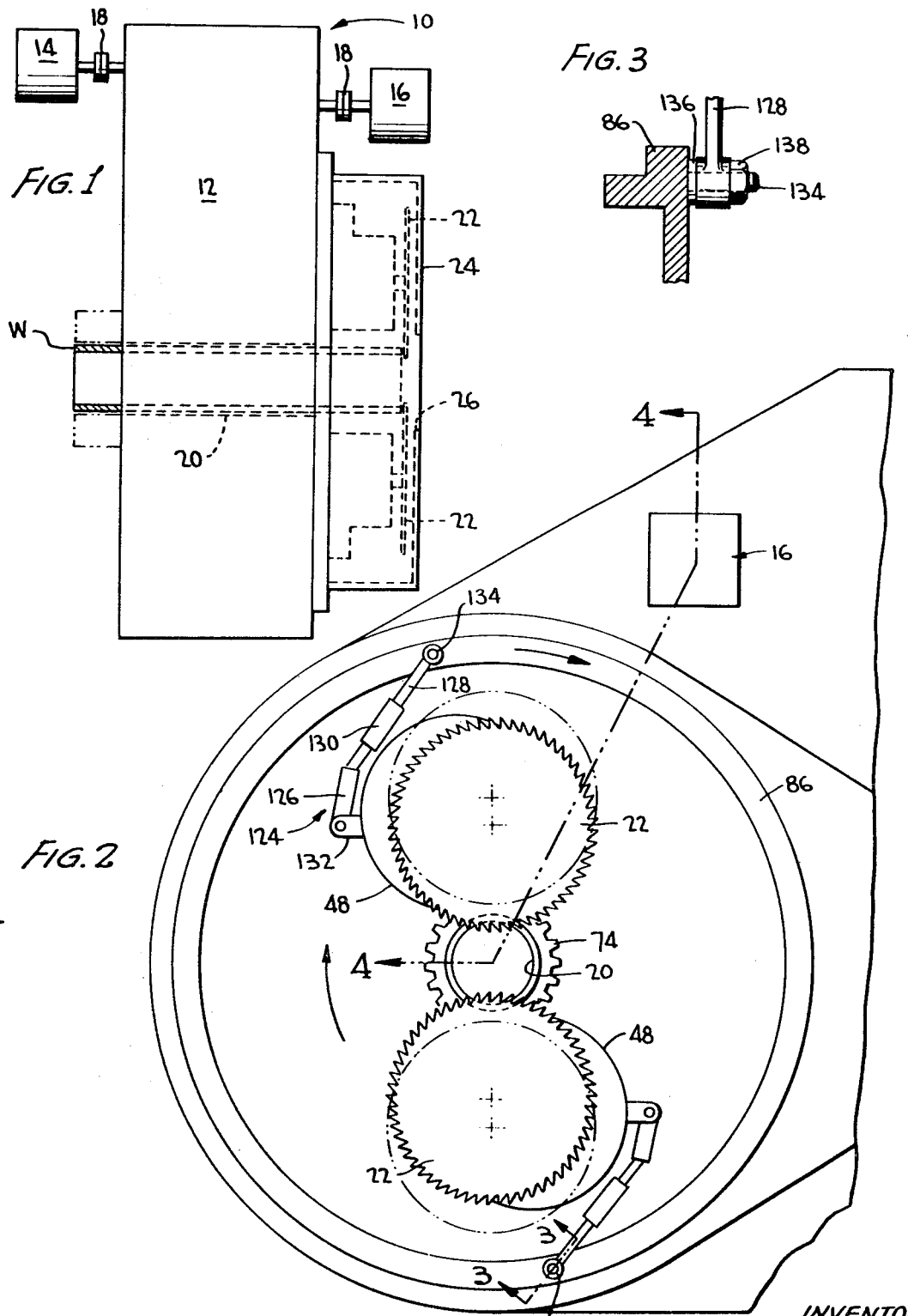

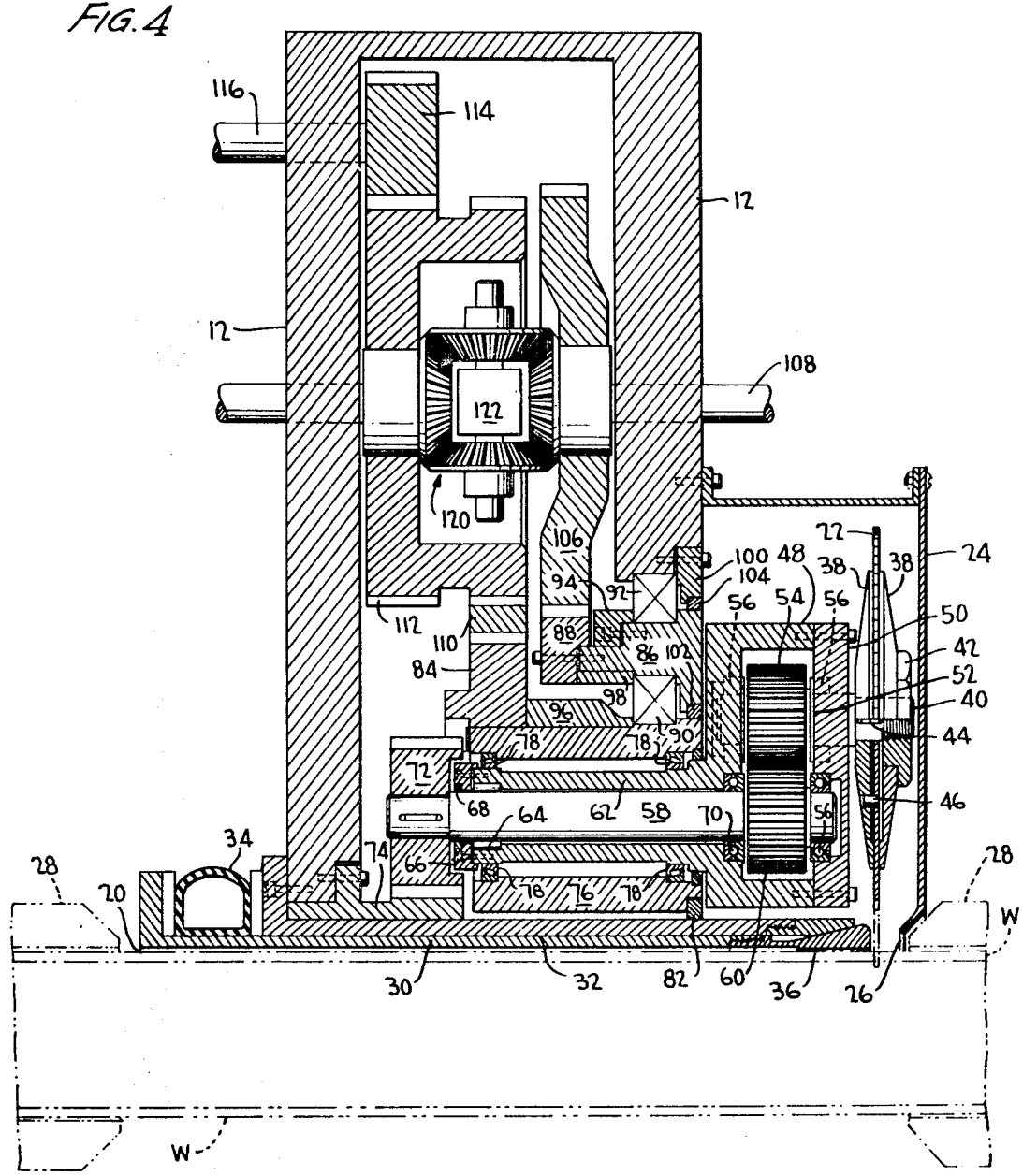

3,608,410
ROTARY SEVERING METHOD AND APPARATUS
Raymond G. Brownstein, 300 Fountain Ave.,
Ellwood City, Pa. 16117
Original application Sept. 25, 1967, Ser. No. 670,195, now Patent No. 3,522,747. Divided and this application Feb. 3, 1970, Ser. No. 12,511
Int. Cl. B23b 1/00
U.S. Cl. 82—47      3 Claims

ABSTRACT OF THE DISCLOSURE

A method and means for severing a longitudinally extending stationary workpiece wherein at least one movable severing element, such as a circular saw, is provided. The severing element is orbited about the longitudinal axis of the workpiece while being simultaneously rotated about its own axis of rotation. The rotating and orbiting severing element can be seleectively displaced toward the stationary workpiece to contact and thereby sever the same.

---

This application is a division of Ser. No. 670,195, filed Sept. 25, 1967, now Pat. No. 3,522,747.

This invention relates to the art of severing and more particularly it relates to a method and means whereby a rotatable severing element is utilized to cut or otherwise sever a stationary workpiece.

In the existing or known types of cutting or severing devices, particularly those designed for severing longitudinally extending workpieces such as pipes, rods, and so on, it is customary to provide a means for gripping and rotating the workpiece about its own axis and to provide a further means for advancing a cutting tool into contact with the rotating workpiece. In this regard, conventional severing follows much the same procedure as is utilized on the conventional lathe. The cutting tool itself is advanced transversely to the rotating workpiece by hydraulic pressure or by a suitable screw-drive arrangement.

There are, however, certain drawbacks and disadvantages associated with such known or conventional severing methods and devices. First of all, it has been found that the use of the transversely advanced cutting tool usually results in a burr edge where severing occurs. Additionally, if thin wall tubing is to be severed by such a procedure, the pressure applied by the tool will often deform the walls of the tubing. Also, only a single cutting point on the tool is being utilized, and as a result, this point tends to quickly wear down thereby creating a rough and unsatisfactory cut along the workpiece. Additionally, suitable means must be provided for not only properly gripping the workpiece, but for driving and rotating the same. Also, when the workpiece is being rotated, the speed of rotation becomes impeded when the workpiece is contacted by the cutting tool. Finally, many such known devices use a direct current drive which increases the cost of machine operation since the usual supply of alternating current cannot be utilized directly.

In short, it has been found that existing techniques, machines and methods do not always provide an ideal cut, are extremely expensive and require extra parts and extra moving operations, require constant maintenance and repair and resharpening of the cutting tools, and, in general, form a rather expensive and unsatisfactory way of severing workpieces.

With the foregoing in mind, it is, therefore, an object of the present invention to overcome the difficulties and deficiencies associated with known severing equipment and techniques and to provide instead, a new and improved method and means for accomplishing severing of a workpiece.

Another object of the present invention is to provide a severing method and means wherein a workpiece to be severed is maintained stationary and is not rotated to accomplish the severing.

Another object of the present invention is to provide a method and means for severing a workpiece wherein the cut or severed surface provides a milled surface free from burrs.

Another object of the present invention is to provide a method and means for severing a workpiece wherein the loads applied to the workpiece during severing are kept to a minimum to assure that the workpiece will not be unduly deformed by the severing and to prevent the need for heavy and rugged machine tables which would ordinarily be needed to withstand the loads applied by conventional equipment.

Another object of the present invention is to provide a severing method and means wherein the severing element has a plurality of severing points thereon so that repeated severing operations can be accomplished without the need for replacing or re-sharpening the severing element.

Another object of the present invention is to provide a severing method and means which can be readily programmed for automatic, sequential operation.

Another object of the present invention is to provide severing equipment which is relatively uncomplicated, as compared with prior art machines, and which can be successfully operated for long periods of time without undue maintenance.

Another object of the present invention is to provide a severing machine wherein the severing element or elements can be simply and quickly removed and replaced and wherein severing elements of different sizes can be substituted, one for the other, with only a simple adjustment being required for the machine to compensate for the varying adjustments.

Other objects, advantages and salient features of the present invention will become apparent from the following detailed description, which, taken in conjunction with the annexed drawings, discloses a preferred embodiment thereof.

Referring to the drawings:

FIG. 1 is a plan view of an apparatus in accordance with, and capable of carrying out the method aspects of, the principles of the present invention;

FIG. 2 is a right end view of the apparatus of FIG. 1;

FIG. 3 is a fragmentary sectional view taken substantially along the line 3—3 of FIG. 2; and, FIG. 4 is a sectional view taken substantially along the line 4—4 of FIG. 2.

In general, the apparatus of the present invention can be designated 10 and it includes a main machine frame means generally designated 12, a first drive means generally designated 14 and a second drive means generally designated 16. Each drive means can be in the form of a constant speed A.C. electric motor and each drive means is connected by a suitable flexible coupling 18 to the equipment within the main machine frame 12. A main bore or aperture 20 extends transversely through the apparatus 10 for receiving a longitudinally extended workpiece designated W in FIG. 1. The workpiece itself can be a pipe, a tube, a bar, or other similar material.

The apparatus of the present invention includes a pair of severing elements in the form of circular saws 22. Each saw has preferably somewhere between 100 and 150 saw teeth about the periphery thereof. As shown in FIGS. 1 and 2, the saw blades 22 are disposed on opposite sides of the bore or aperture 20 and are radially movable toward and away from the said aperture. In other words, with reference to FIG. 2, each of the saw blades 22 is movable between its inward position as shown in solid lines and its outward position as shown in dotted lines. As will also be understood by reference to FIG. 2, and as can also be seen in FIG. 1, when the saw blades are moved to their inward position, they would necessarily sever the workpiece W extending through the aperture or bore 20. On the other hand, when the saw blades 22 are moved to their outward position, the teeth on such blades will not contact the workpiece W extending through the bore 20. It is possible, as will be explained hereinafter, to adjust the position of the opposed saw blades 22 to control the spacing therebetween.

As is shown in FIGS. 1 and 4, the saw blades are protected by means of a guard 24 which projects from the forward face of the machine frame 12 and which is provided with an opening or aperture 26 coextensive with the bore 20. The workpiece W is to be maintained in position within the bore 20 in a non-rotating, stationary position, and accordingly, means must properly be provided for gripping the workpiece W. To this end, external workpiece grips 28, 28 may be provided at opposite ends of the machine in alignment with the bore to grip upon the workpiece W and to hold the same in position. Alternately, and preferably, a pair of telescoped guide tubes 30 and 32 are provided in the bore, as shown in FIG. 4. Each of these guide tubes is provided with an external flange means and a pneumatic spring or cushion 34 is provided therebetween. With such an arrangement, a collet 36 is provided to cooperate with the telescoping tube means and to grip the exterior of the workpiece W. Naturally, the size or diameter of the collet 36 can be varied in accordance with the size or diameter of the workpiece. When air pressure is introduced into the pneumatic spring 34, the tubes 30 and 32 are telescoped apart and hence the outermost tube 32 cams against the exterior surface of the collet and forces the interior surface thereof into gripping engagement with the workpiece W. Alternatively, when pneumatic pressure is released from the pneumatic spring 34, the tubes 30 and 32 re-telescope to release gripping pressure of the collet 36.

To understand the internal arrangement of the apparatus 10, attention is directed to FIG. 4 wherein it can be seen that the severing element or saw blade 22 is mounted between a pair of opposed clamping plates 38, 38 and is maintained upon a shaft 40 by means of a suitable nut 42. A key 44 locks the saw non-rotatably upon the shaft 40 and a drive pin 46 extends between the saw blade and at least one of the face plates 38 thereof.

The saw 22 as mounted upon the saw shaft 40 is connected to a saw housing 48 having a housing cap 50 thereupon. The shaft 40 extends through the housing cap 50 and is sealed by means of a seal 52, and once within the housing, the shaft serves to mount a saw arbor or pinion 54. Suitable opposed radial and thrust bearings 56 mount the saw shaft 40 within the housing 48.

Also extending into the saw housing 48 is a drive shaft 58 having an integral drive pinion 60 attached to the end thereof, with the drive pinion being disposed in meshing engagement with the pinion 54. The drive shaft 58 itself extends through an elongated tubular portion 62 of the saw housing 48 and at the end of this tubular portion 62 a needle bearing 64 is provided for the drive shaft 58 and a clamping plate 66 having a sealing ring 68 is locked against the end of the portion 62 to maintain the needle bearing in position. At the opposite end, adjacent the pinion 60, another radial and thrust bearing 56 is provided at the housing cap and a thrust bearing 70 is provided along the opposite side of the pinion. A saw drive gear 72 is mounted at the outboard end of the drive shaft 58, beyond the saw housing, and such saw drive gear meshes with a ring gear 74 which is stationary and non-rotatable due to the fact that it is fastened to the machine frame 12.

Continuing with the description in FIG. 4, a tubular mounting ring 76 surrounds the tubular portion 62 of the saw housing with tapered roller bearings 78 interconnecting the interior of the ring 76 with the exterior of the portion 62. A sealing ring 80 is provided between the housing portion 62 and the mounting ring 76 adjacent the rear face of the main housing portion 48. Another sealing ring 82 extends between the mounting ring and the outer telescoping tube 32. A gear 84, which acts as the ring driving gear, is connected to the mounting ring 76 to drive the same in a manner to be described hereinafter.

There is also provided in the apparatus 10, a circular feed ring 86 which has mounted thereupon, a feed ring gear 88. This feed ring gear drives the feed ring 86 in a manner to be presently described. A pair of bearings 90 and 92 serve to mount the feed ring 86, the former extending between the feed ring and the mounting ring, and the latter extending between the feed ring and the frame. The bearings 90 and 92 are of a type that can accept radial, thrust and over-turning loads simultaneously. Suitable clamping means in the form of clamp rings 94, 96, 98 and 100, serve to properly position the bearings 90 and 92, and sealing rings 102 and 104 are additionally provided to fully protect and seal the assembly.

For an understanding of how the gears 84 and 88 drive the mounting ring and the feed ring respectively, it will be noted that the gear 88 meshes directly with a differential feed drive gear 106 which is connected by a shaft 108 mounted in the machine frame. The gear 84 is connected via an idler gear 110 to a main motor driven gear 112. The gear 112 is driven by a pinion 114 connected on a shaft 116 which extends to the driving motor 14. A suitable differential gear arrangement generally designated 120 serves to interconnect the gears 106 and 112 and a lockable differential spider 122 serves as a control for the differential gears, the spider itself being controlled by the drive means 16. In one position, the spider 122 serves to assure a differential connection through the gears 120 between the gears 106 and 112. Thus, when the main motor 14 rotates the pinion 114 to drive the gear 112 at a particular r.p.m., then the gear 106 will likewise be driven at the same r.p.m. Alternatively, when the spider 122 is moved to a different position, then the rotational speed or r.p.m. of the gear 106 will differ from that of the gear 112 to effect movement and operation of the saws 22 in a manner to be described shortly hereinafter. First, however, operation of the system described thus far will be set forth.

As the pinion 114 rotates the gear 112, such rotation in turn is transmitted through the idler 110 to the ring driving gear 84 to rotate the mounting ring 76. As the mounting ring 76 is moved, it, in turn, orbits the saw drive gear 72 about the ring gear 74. This orbital movement causes the drive gear 72 to rotate, thereby rotating the shaft 58 and its integral pinion 60 and thus, in turn, rotating the saw pinion 54, the saw shaft 40 and the saw blade 22 attached thereto. The peripheral speed of the teeth at the edge of the saw 22 plus the induced speed from the rotation of the mounting ring 76 equals the recommended saw tooth speed.

The foregoing description will thus render apparent the manner in which the saws 22 are orbited while, in turn, being simultaneously rotated about their own axes of rotation as represented by the central axis of the saw mounting shafts 40.

There is provided, however, in the present invention, an additional means for movement of the saws and their housings 48 about the axis of the drive shaft 50. Such movement is intended to displace the saws toward and away from the central axis of the bore 20 extending through the machine, as indicated by the solid line-dotted line arrangement of the saws indicated in FIG. 2 and previously described. To this end, a means generally designated 124 is provided for interconnecting the saw housings 48 with the feed ring 86. This means 124 can best be seen in FIGS. 2 and 3 and includes an elongated pair of links 126 and 128 interconnected by a locking turnbuckle 130. The link 126 is pivotally connected to a lug 132 extending from the saw housing 48. At the opposite end, as shown in FIG. 2, a pin 134 projects from the feed ring 86 and the link 128 is fitted onto this pin. A washer 136 is positioned between the link and the feed ring 86 and a nut 138 maintains the link in position. Proper adjustment of the locking turnbuckle can draw the links 126 and 128 toward and away from each other, thereby providing an adjustment as to the ultimate degree of movement of the saws 22.

So long as the spider 122 is in a position where the gears 106 and 112 operate at the same r.p.m., then the saws 22 will merely orbit and rotate in their outermost position, i.e., the position shown in dotted lines in FIG. 2. However, when the spider 122 is activated to create a differential speed between the gears 112 and 106, then in turn, the rings 76 and 86 will be rotated at a different r.p.m., or, in broader terms, the speed of orbit of the saw housings 48 will no longer be the same as the speed of rotation of the feed ring 86. This variation in speed will cause the linkage means 124 to cam or rotate or otherwise displace or move the saw housing 48, and as a result, the saws will be progressively moved inward along a spiral or convolute curve. Thus, the teeth on the saw 22 will eventually contact the walls of the workpiece and will cut therethrough due to the fact that the saws themselves are continuing to rotate and orbit as they are moved inwardly. Once the severing has been effectuated, the spider can be rotated in the reverse position, thereby causing the saws to move back outwardly to thereby open the bore 20 for reception of a new workpiece portion to be severed.

It will be appreciated that all of the operating elements of the machine are enclosed within the machine frame 12 to be free from the chips and other pieces caused by the cutting and from the cutting oil. The oil itself serves to lubricate the parts so that the machine can operate for extended periods of time. As shown in FIG. 2, the chips and oil are eventually fed to one side where they can be readily cleaned out at intervals. The guard 24 serves as a safety device to prevent anyone's hands from contacting the saw blades 22, and additionally, it serves to properly contain the saw chips and the cutting oil within the machine itself.

It will be readily understood that the apparatus of the present invention could be easily programmed to operate automatically. In this regard, only the driving means 16 must be alternated at selected times to reverse operation of the spider 122, and suitable means must be provided for alternately and intermittently advancing the workpiece W through the bore 20 of the machine. However, once these program settings are properly adjusted, the machine can thereafter operate automatically without the need for any operator or attendant.

It will be understood from the foregoing description that the invention set forth herein provides a novel severing means and method which can create smooth milled cuts along a workpiece, even a thin walled one, and which will not in any way deform the workpiece. To reiterate, the driving mechanism includes a differential gearing arrangement and a locking spider therebetween so that the gears 106 and 112 can be selectively operated at the same rotational speeds or at different rotational speeds. This thus creates a selective in-phase or out-of-phase operational condition for the apparatus. When the apparatus is operating in phase, i.e., the gears 106 and 112 are rotating at the same r.p.m., then the saws 22 will be orbited about the ring gear 74 and will simultaneously be rotated about their own axes of rotation. In such condition, the central bore of the machine through which the workpiece passes is open and exposed, and a new length of workpiece can be projected between the rotating and orbiting saw blades. Then, when operation of the locking spider causes the gears 106 and 112 to operate out of phase, i.e., at differing rotational speeds, then the rotational speed of the feed ring 86 will vary from the rotational speed of orbiting of the saws, and as a result, the linkage means 124 will displace the orbiting and rotating saws inwardly along a generally convolute path. This inward movement will eventually bring the peripheral teeth on the saws into contact with the walls of the workpiece and due to the continued orbiting and rotating movement of the saws, the workpiece will be smoothly severed. Then, the rotational speed of the gears 106 and 112 can be brought back into phase thus causing the saws to move outward along a generally involute path until they reach their outermost condition whereupon the orbiting and rotating will continue, but the workpiece bore will be opened once more to permit feeding of a new portion of the workpiece to be severed.

After reading the foregoing detailed description, it should be apparent that the objects set forth at the outset of the specification have been successfully achieved by the present invention.

What is claimed is:

1. A method for severing a longitudinally extending workpiece comprising the steps of:
   orbiting a severing element about the longitudinal axis of said workpiece;
   rotating said severing element about its axis of rotation during said orbiting;
   rotating a ring means concentrically arranged about said longitudinal axis, which ring means is operatively interconnected with said severing element; and
   selectively displacing said axis of rotation toward said longitudinal axis until said severing element contacts said workpiece and severs the same as said orbiting and rotating continue.

2. A method as defined in claim 1, further characterized in normally rotating said ring means in synchronism with said orbital speed of said severing element to maintain said severing element against movement toward said longitudinal axis.

3. A method as defined in claim 2, further characterized in selectively operating said ring means out of synchronism with said oribiting of said severing element to thereby effect said selective displacing of said severing element axis of rotation.

References Cited
UNITED STATES PATENTS

| | | | |
|---|---|---|---|
| 3,029,674 | 4/1962 | Southwell et al. | 82—53.1X |
| 3,165,034 | 1/1965 | Coacho | 82—53.1X |
| 3,289,506 | 12/1966 | Morsbach et al. | 82—101X |
| 3,293,963 | 12/1966 | Carroll et al. | 82—47X |

HARRISON L. HINSON, Primary Examiner